Figure 1:
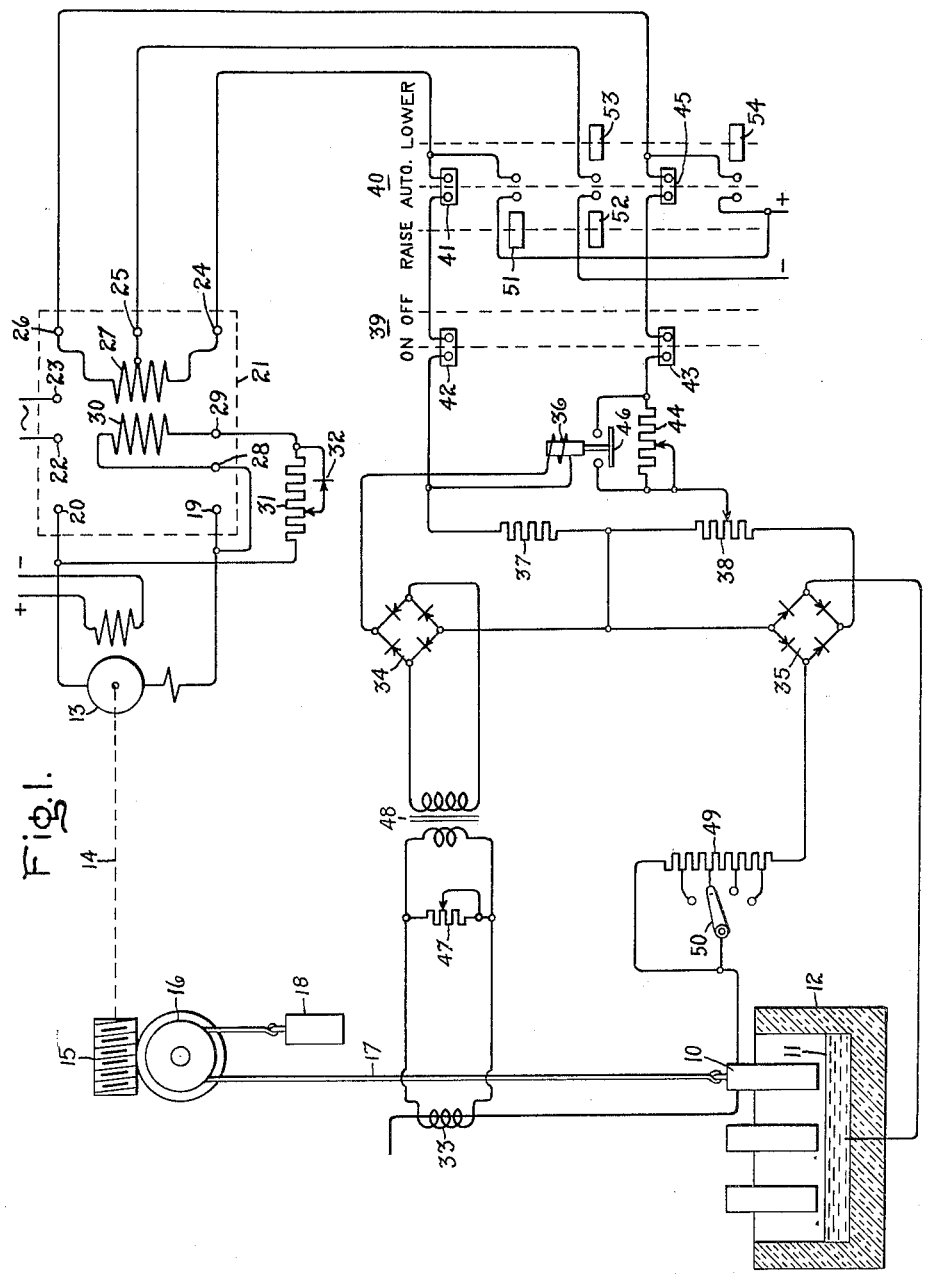

Sept. 6, 1955  F. DE LA R. GUNTON  2,717,326
ELECTRIC ARC FURNACE CONTROL SYSTEMS
Filed Dec. 14, 1951  2 Sheets-Sheet 1

Inventor:
Frank de la Roche Gunton,
by  *[signature]*
His Attorney.

United States Patent Office 2,717,326
Patented Sept. 6, 1955

2,717,326

ELECTRIC ARC FURNACE CONTROL SYSTEMS

Frank de la Roche Gunton, Rugby, England, assignor to General Electric Company, a corporation of New York Application December 14, 1951, Serial No. 261,650

3 Claims. (Cl. 314—69)

This invention relates to control systems for electric arc furnaces of the type in which each electrode is moved toward and away from the charge in the furnace by means of a motor as described in the prior patent specifications Nos. 2,354,911 and 2,351,420.

The object of this invention is to provide a system of continuous automatic control for the arc furnace electrode driving motors, providing automatic striking and maintenance of the arc, by means of apparatus which has no rotating parts.

This invention consists in the use of a magnetic amplifier with associated control circuits as a means for controlling the operation of the direct current motors which drive the mechanism for adjusting the position of the electrodes with respect to the charge in the furnace. Each motor is controlled by a separate magnetic amplifier and each amplifier may be of the kind in which a direct current voltage output is obtained from it which is dependent in magnitude and polarity on the magnitude and polarity of an input signal or the resultant of a number of input signals applied to various input control windings. The magnetic amplifiers may have a single or a plurality of stages. The output of each of the magnetic amplifiers is applied to the armature of the corresponding direct current electrode motor whose field windings may be permanently excited from a separate supply.

The main input signal would be arranged to be a measure of the departure of the actual arc current from the value desired. This signal may be derived, for example, from the difference between two signals, one proportional to the voltage across the arc associated with the corresponding electrode and the other proportional to the current in the arc. This has the advantage that when an electrode (having been caused by the presence of a voltage signal and the absence of a current signal to approach the charge preparatory to striking an arc), touches the charge the voltage difference between the electrode and the charge disappears and if current does not immediately flow in the electrode the motor will stop and there will be no tendency for the electrode to continue moving.

A further advantage is that an increase of current in the electrode circuit owing to a piece of metal falling against the electrode is accompanied by a drop of voltage across the arc. The unbalance between the signals will then be greater than if the current signal were being compared with a constant reference signal, and the correcting effect will be correspondingly increased.

Also in the case of a three-phase furnace, short-circuiting of one arc causes an increase in the current in the other two electrodes but with an increase in their arc voltages so that the increase in current is substantially offset by the increases in arc voltages and very little regulation of these electrodes takes place. In this way a disturbance at one electrode causes the electrode concerned to readjust itself, leaving the other two electrodes substantially unaffected.

Where the electrodes carry equal current at all times as in the case of a single phase furnace employing two electrodes, one arc being maintained at each electrode, a common current signal could be applied to each magnetic amplifier, the signal measuring the desired current value being provided by a fixed "bias" excitation, and a further signal to each magnetic amplifier may be derived from the difference between the arc voltages, these signals being applied in such a way that the motors are caused to rotate in directions to cause one arc to be shortened and the other lengthened in order to balance the voltages across the arcs and therefore the power converted into heat in the two arcs.

It will be understood that the signals applied to the amplifiers can be derived in many ways and that the operation of the entire system can be given any required degree of damping to prevent hunting by applying additional signals to the control windings of the amplifiers such additional signals being derived in various ways and from various points in the system. It will also be understood that hand control of the electrodes may be effected when desired by arranging for either the motor or the input of its controlling amplifier to be switched on to a separate direct current supply of appropriate voltage and polarity. The main and additional signals and arrangements for hand control may be similar to those described in patent specification No. 2,354,911 for single phase two electrode furnaces or as described in patent specification No. 2,351,420.

If it is desired to reduce the speed at which the electrode approaches the charge preparatory to striking the arc, a relay can be provided, connected in such a way as to reduce the sensitivity of the control system, for example by reducing the strength of the main signal, when no current is flowing in the electrode. Suitable means for effecting this are described in the patent specifications above referred to.

The invention will be better understood by reference to the accompanying diagram in which Fig. 1 illustrates one form as applied to a three electrode A. C. electric arc furnace and Fig. 2 shows the connections within the magnetic amplifier shown in Fig. 1.

The arrangement shown in Fig. 1 is for automatically controlling a single electrode 10 in relation to a metal charge 11 contained in a crucible 12 there being no main current connection from the furnace charge to the supply transformer neutral. A simple scheme for introducing manual control is also shown. It will be understood that duplicate means would be provided to control each of the other two electrodes.

The electrode 10 is raised and lowered by a direct current motor 13. The shaft 14 of the motor is connected preferably through speed reducing gearing 15 to a sheave 16 over which passes a cable 17 connected to the electrode, the other end of the cable carrying a counterweight 18. Direct current is supplied to the armature of motor 13 from the output terminals 19 and 20 of the magnetic amplifier 21. The shunt field winding of motor 13 is connected to a constant D. C. source.

Figure 2:
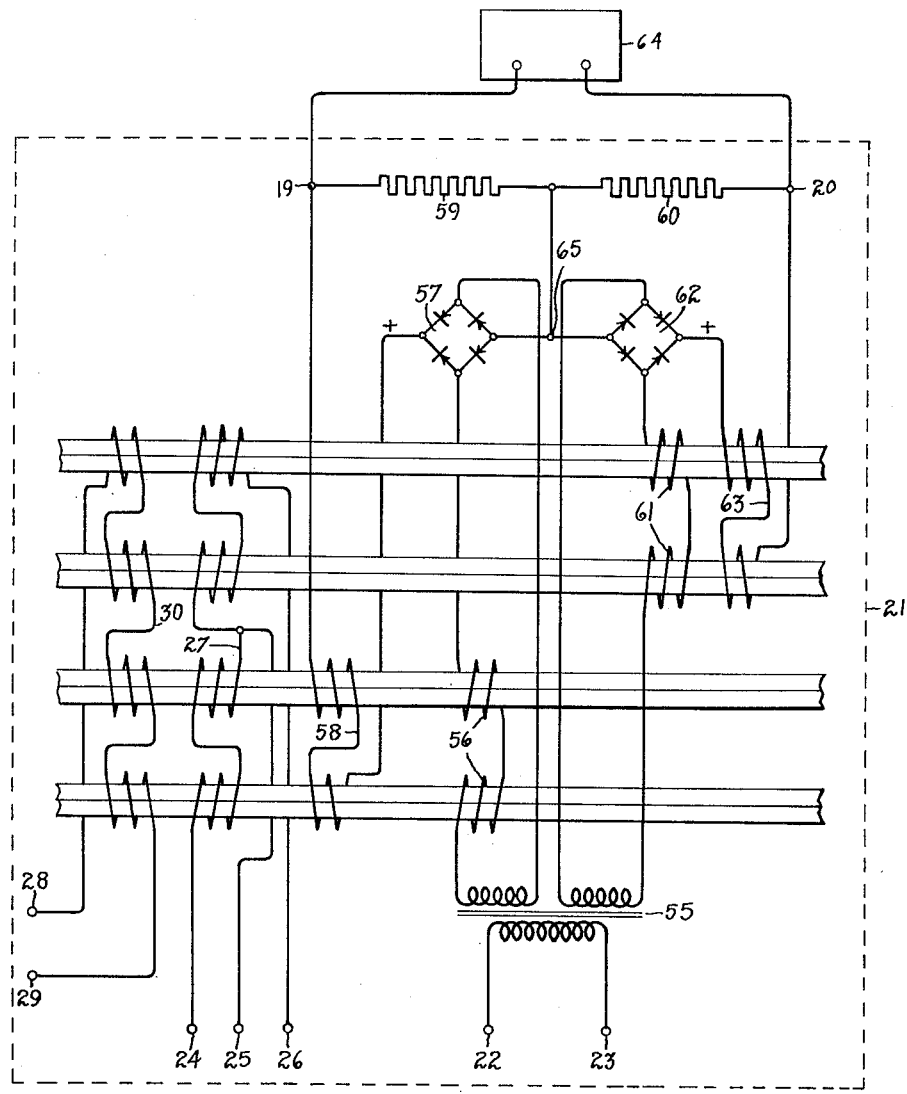

The magnetic amplifier 21, a more particular description of which is given in connection with Fig. 2, is also provided with terminals 22 and 23 which are connected to a suitable source of A. C. power, terminals 24, 25 and 26 to which is connected the centre tapped control winding 27, and terminals 28 and 29 to which is connected a feedback winding 30. The supply for winding 30 is derived from output terminals 19 and 20 through a resistance 31, across part of which is connected a metal plate rectifier 32.

The magnetic amplifier 21 is of the well known type in which the magnitude and polarity of its D. C. voltage output depends on the magnitude and direction of the resultant excitation set up by windings 27 and 30, and in which very little resultant excitation is required to produce a given output.

When a steady current flows in winding 27, a D. C. voltage appears across 19 and 20. This causes current to flow in winding 30. Since very little net excitation is required to produce a given output, the current in winding 30 assumes a value such as nearly to cancel the excitation due to winding 27. The voltage across 19 and 20, and thus the speed of motor 13 thus becomes substantially proportional to the current flowing in winding 27.

Since the current in winding 30 is substantially proportional to the speed of motor 13, winding 30 also has the effect of "damping" the movement of the electrode. The strength of this damping effect and the sensitivity of the system may be varied by adjusting the resistance 31 in series with winding 30. A blocking rectifier 32 is provided across a section of resistance 31 to pass current and short out a portion of the resistance 31 in one direction. Thus the sensitivity of the system can be varied as between raising and lowering the electrode to obtain the best furnace performance.

The control winding 27 is connected for energization across two voltages in opposition to each other so as to be energised in response to the difference in these voltages. One of these voltages is derived from a current transformer 33 connected in the electric supply circuit for the electrode 10 and is substantially proportional to the current in the electrode. The other voltage is derived from the voltage between the electrode and the charge 11 and is substantially proportional to the arc voltage. These voltages are rectified for the control winding 27 by means of metal plate rectifiers 34 and 35 respectively. The direct current from the rectifier 34 passes through the relay coil 36 to resistance 37 and the voltage of rectifier 35 is applied to potentiometer resistance 38.

When switches 39 and 40 are in the positions shown, the circuit for winding 27 leads from terminal 24 through a closed contact 41 on switch 40 a closed contact 42 on switch 39, resistance 37, an adjusted portion of resistance 38, an adjusted portion of resistance 44, a closed contact 43 on switch 39, a closed contact 45 on switch 40 and so to terminal 26 of winding 27.

When the electrode 10 is raised out of contact with the charge 11 and no arc is established, as in the starting of the furnace, no current flows in the electrode and the entire voltage selected from resistance 38 is applied to winding 27 in series with resistance 37. Current then flows in winding 27 in a direction to cause the motor to lower the electrode. The initial lowering operation is preferably at a relatively slow speed and to effect this the resistance 44 is provided and is adjusted to give the desired slow lowering speed before striking the arc.

When the electrode 10 is lowered far enough to come in contact with the charge, the voltage across rectifier 35 is reduced to zero. If electrode 10 is the first of the electrodes to touch the charge, no current flows in it and no current is therefore passed through rectifier 34. Excitation of winding 27 therefore ceases and motor 13 stops, thus motor 13 does not attempt to lower the electrode further. When another electrode touches the charge, a large surge of current flows, in response to which current flows through rectifier 34, and winding 27 is energised in the direction to cause the motor 13 to raise the electrode. Immediately, the coil 36 is energised and closes the switch 46 thereby short-circuiting the resistance 44 for maximum energization of the control winding 27 for quick raising or recovery of the electrode to an arcing position, and for high speed adjustment of the electrode during the operation of the furnace. The electrode is raised until the electrode current is of such a value that the voltage developed across resistance 37 is substantially equal to the voltage from the resistance 38 in series with it. Under these conditions, since the two voltages oppose each other, no current flows in the control winding 27 and the motor is deenergised so that the electrode is held in that position. The relay switch 46 remains closed as long as current flows in the electrode circuit. If for any reason the arc is extinguished, the switch 46 immediately opens and the electrode is lowered at a slow speed again to re-establish the arc.

If, when starting the furnace, electrode 10 is not the first to touch the charge, then current will flow in it immediately it does touch the charge and reversal of energization of winding 27 and energization of coil 36 will take place immediately, subsequent action being as described above.

The position of the electrode corresponding to the setting of the resistance 38 is now held automatically. If the furnace current decreases, the voltage across resistance 37 likewise decreases and the control winding 27 is energised in a direction to cause the electrode to be lowered until balance is again restored. Conversely, if the furnace current increases above the predetermined value corresponding to the adjustment of the resistance 38, the voltage across resistance 37 likewise increases, and the control winding 27 is energised in the opposite direction to raise the electrode until balance is again restored.

A variable current adjusting resistance 47 is connected across the current transformer 33 by means of which the control may be adjusted for ranges beyond the normal range of the resistance 38.

A current transformer 48, having a core which saturates at high values of current is interposed between current transformer 33 and rectifier 34. The core saturates in the event of heavy current surges such as are commonly encountered at the beginning of the furnace operation when the arc is made and broken rapidly before the furnace current reaches a steady state. The current passed through rectifier 34 and into the control circuit under these conditions is therefore limited to a safe value.

Ordinarily in the operation of the furnace, several voltages are used as desired in the melting of a charge, and these are normally selected by a tap-changing switch on the transformer which is used to provide the A. C. supply for the furnace. It is necessary to provide means whereby the voltage applied to rectifier 35 is the same whatever transformer tap is being used. For this purpose, resistance 49 is connected in series with rectifier 35, and a short-circuiting switch arm 50 is provided to short out appropriate sections of resistance 49 so that a change in transformer voltage makes a corresponding change in the resistance of resistor 49 and the voltage applied to the rectifier remains unchanged.

For the manual control of the electrode, switches 39 and 40 are provided. During automatic operation, both switches are in the position shown in Fig. 1. If it is desired to raise or lower the electrode by manual control, switch 40 is placed in the desired position. In the "raise" position, that portion of winding 27 between terminals 24 and 25 is connected through contacts 51 and 52 to a separate source of direct current and current flows in that part of winding 27 to cause the motor 13 to raise the electrode. In the "lower" position, that portion of winding 27 between terminals 26 and 25 is connected through contacts 53 and 54 to the aforementioned source of direct current and current flows in that part of winding 27 to cause the motor 13 to lower the electrode.

If it is desired to remove automatic control from the electrode without moving the electrodes on manual control, switch 39 can be moved to the position shown as "auto off."

It will be understood that known devices may readily be incorporated in the scheme, such as: protective devices; limit switches with or without suitable "back-out" arrangements; more complex arrangements of manual control switches to enable all three electrodes to be raised or lowered simultaneously if desired. When magnetic amplifiers of more than one stage are used, manual control switches may be connected between the stages; again suitable manual control switches may be connected in the leads supplying motor 13, or between the output of the magnetic amplifier and the field of a generator if such is used.

One suitable arrangement for the internal circuits of the single stage magnetic amplifier shown as 21 in Fig. 1 is shown in Fig. 2. In this figure the A. C. supply terminals 22 and 23 are connected to the primary winding of transformer 55 which has two separate secondaries. Current from the left hand secondary passes through A. C. coils 56 to rectifier 57. The D. C. output of rectifier 57 passes through self-exciting winding 58, then partly through resistance 59 and partly through the load 64 and resistance 60 to terminal 65. Current from the right hand secondary passes through A. C. coils 61 to rectifier 62. The D. C. output of rectifier 62 passes through self-exciting winding 63, then partly through resistance 60 and partly through load 64 and resistance 59 to terminal 65. As is well known, such an arrangement as is shown in Fig. 2 can be used so that the magnitude and polarity of the voltage appearing across the terminals 19 and 20 depend on the magnitude and direction of the resultant excitation set up by windings 27 and 30.

What I claim as new and desire to secure by Letters Patent of the United States is:

1. A control system for an electric arc furnace provided with a plurality of electrodes having connections to a source of alternating voltage, means for deriving a control voltage proportional to the current in one of said electrodes comprising a current transformer energized by said current and a rectifier having its input terminals connected to the secondary winding of said transformer and provided with output terminals, a first resistor connected across said output terminals, means for deriving a control voltage proportional to the voltage across the arc from said electrode to the charge in said furnace comprising a second rectifier provided with input terminals connected across said arc and provided with output terminals, a resistor connected across the output terminals of said second rectifier, an electric motor mechanically connected to drive said electrode and means responsive to the difference of said control voltages for selectively energizing said motor for raising and lowering said electrode comprising a magnetic amplifier having direct voltage output terminals connected to said motor, a main reactance winding connected to said output terminals, and a control circuit including said resistors connected in series relationship with their voltage drops opposing each other and a saturation control winding connected in series relationship with said resistors and mounted in inductive relationship with said reactance winding.

2. A control system for an electric arc furnace provided with a plurality of electrodes having connections to a source of alternating voltage, means for deriving a control voltage proportional to the current in one of said electrodes comprising a current transformer energized by said current and a rectifier having its input terminals connected to the secondary winding of said transformer and provided with output terminals, a first resistor connected across said output terminals, means for deriving a control voltage proportional to the voltage across the arc from said electrode to the charge in said furnace comprising a second rectifier provided with input terminals connected across said arc and provided with output terminals, a resistor connected across the output terminals of said second rectifier, an electric motor mechanically connected to drive said electrode and means responsive to the difference of said control voltages for selectively energizing said motor for raising and lowering said electrode comprising a magnetic amplifier having direct voltage output terminals connected to said motor, a main reactance winding connected to said output terminals, a control circuit including said resistors connected in series relationship with their voltage drops opposing each other and a saturation control winding connected in series relationship with said resistors and mounted in inductive relationship with said reactance winding, and means for increasing the electrode raising speed of the motor with respect to the lowering speed comprising a third resistor connected in series relationship in said control circuit and an eletcromagnetic switching device connected to be responsive to the electrode current for rendering said third resistor ineffective.

3. A control system for an electric arc furnace provided with a plurality of electrodes having connections to a source of alternating voltage, means for deriving a control voltage proportional to the current in one of said eelctrodes comprising a current transformer energized by said current and a rectifier having its input terminals connected to the secondary winding of said transformer and provided with output terminals, a first resistor connected across said output terminals, means for deriving a control voltage proportional to the voltage across the arc from said electrode to the charge in said furnace comprising a second rectifier provided with input terminals connected across said arc and provided with output terminals, a resistor connected across the output terminals of said second rectifier, an electrode motor mechanically connected to drive said electrode and means responsive to the difference of said control voltages for selectively energizing said motor for raising and lowering said electrode comprising a magnetic amplifier having direct voltage output terminals connected to said motor, a main reactance winding connected to said output terminals, a control circuit including said resistors connected in series relationship with their voltage drops opposing each other and a saturation control winding connected in series relationship with said resistors and mounted in inductive relationship with said reactance winding, damping means for effecting operation of said motor at a speed corresponding in magnitude to the difference of said control voltages comprising a second control winding on said magnetic amplifier opposing said first control winding and connected to be responsive to the armature voltage of said motor, a resistor connected in series relationship with said opposing control winding and a rectifier connected in parallel with a portion thereof to provide for varying the damping effect of said opposing control winding selectively in accordance with the direction of rotation of said motor.

References Cited in the file of this patent

UNITED STATES PATENTS

| | | |
|---|---|---|
| 1,991,091 | Harding | Feb. 12, 1935 |
| 2,329,127 | Levy | Sept. 7, 1943 |
| 2,354,911 | Edwards et al. | Aug. 1, 1944 |
| 2,456,936 | Frostick | Dec. 21, 1948 |
| 2,534,958 | Deming | Dec. 19, 1950 |